Patented Feb. 10, 1925.

1,526,039

UNITED STATES PATENT OFFICE.

WILLIAM C. ARKELL AND MARION G. MASTIN, OF CANAJOHARIE, NEW YORK.

CHEWING GUM AND METHOD OF MAKING THE SAME.

No Drawing. Application filed May 12, 1922. Serial No. 560,392.

*To all whom it may concern:*

Be it known that we, WILLIAM C. ARKELL and MARION G. MASTIN, citizens of the United States, both residing at Canajoharie, in the county of Montgomery and State of New York, have invented certain new and useful Improvements in Chewing Gum and Methods of Making the Same, of which the following is a specification.

Our invention relates to new and useful improvements in chewing gum and method of making the same, and while it is applicable in the manufacture of chewing gum generally, it particularly relates to the manufacture of chewing gum composed in whole, or in part, of a low grade rubber base, such, for example, as chicle, pontianak, etc.

In the manufacture of chewing gum from low grade rubber base, it is known that, when flavored with essential oils, and particularly oil of wintergreen, during the process of making the gum the oil attacks the rubber, and acts to an objectionable degree to destroy the characteristics of the gum which are essential to a satisfactory product—for example, cohesiveness, ductility, plasticity, etc. We have discovered that if the essential oil or flavoring is combined with the gum in a finely divided condition, and the particles of the flavoring or oil are encased in a suitable covering so as not to contact directly the gum during manufacture, the deleterious effect of the flavoring on the gum is prevented or largely reduced.

In the preferred embodiment of our invention, we emulsify the essential oil constituting the flavoring with a suitable emulsifying agent, so that said oil when combined with the low grade rubber base is in the form of fine particles encased in the emulsifying agent. The emulsifying agent, for example, may be condensed milk, or casein-bearing substance, a solution of powdered skim-milk, casein, or evaporated milk. When the flavoring material, particularly an essential oil, in the form of an emulsion, is combined with the gum, the deleterious action of the oil on the gum is greatly reduced and the flavoring remains in its protective coating of the emulsifying agent until the gum is masticated, when the flavoring is released and its flavoring charactertistic upon the gum becomes apparent.

One method by which our invention is put into practice is as follows:

The low grade rubber, such, for example, as chicle or pontianak, or similar base material, is cooked in a suitable kettle in any of the ways well-known in chewing gum manufacture until the mass reaches the desired consistency, whereupon other ingredients commonly employed in chewing gum manufacture, such as sugar, glucose, starch, condensed milk, etc., are added and the cooking continued for a desired period. The cooking just described may be carried on in a steam jacketed kettle of any well-known type commonly employed in chewing gum manufacture. After the ingredients named, or others which may have been selected, have been added, the cooking is continued until the mass reaches the desired condition, whereupon the heating is discontinued and the flavoring, in the form of an essential oil which has been emulsified, is added and worked into the gum mass while the latter is plastic, and heated.

According to our invention, the essential oil is emulsified preferably by the use of any casein-bearing substance suitable for food use, for example, condensed or evaporated milk, a solution of casein, or a solution of powdered skim-milk, etc. For example, a suitable formula is by weight 2 parts of condensed milk, 1 part of water, and 3 parts of wintergreen oil, if that be the flavoring desired. The mixture is put into a suitable chamber such as commonly used in the manufacture of salad dressing, for example, a Hobart machine, which consists of a kettle or receptacle having a wire whip agitator. However, any suitable means may be employed for emulsifying the flavoring material with the emulsifying agent. If desired, the wintergreen oil may be diluted with a tasteless paraffine oil, or a fatty oil, such as cotton-seed oil, but this is not essential. The emulsification is preferably carried to an extent where the emulsion is of a heavy pasty consistency, for example, has a body similar to heavy whipped cream.

When the emulsion is added to the gum base, it is thoroughly mixed therewith by the usual means employed for mixing the flavoring material with such base.

The production of the emulsion serves to break up the essential oil into fine particles and to encase these particles in the emulsifying material, so that when the emulsion is added to the gum mass, the essential oil to a large degree is prevented from coming into direct contact with the base, and from having deleterious action thereon. We have found by actual practice that the oil is held in its protective casing until the gum is masticated, when the oil is released.

The invention is particularly applicable when oil of wintergreen is employed as a flavoring medium, as this oil has a particularly objectionable effect in attacking the gum base. However, we desire it understood that our invention is not limited in its application to wintergreen oil, as it may be applied to other flavoring oils or materials.

The finished product embodies the gum containing the flavoring in finely divided form or particles which are encased in the emulsifying material. It will be found that in the product the flavor will be so efficiently protected that the odor of the flavoring will be much less noticeable than when the flavoring is not emulsified. However, when the gum is masticated, the particles of flavoring are quickly released from the protective coating and the odor and taste are readily appreciated by the user.

What we claim and desire to secure by Letters Patent of the United States is:—

1. As a new article of manufacture, a chewing gum comprising a rubber base susceptible to impairment by contact with an essential oil used as a flavoring ingredient, a flavoring material comprising an essential oil having a deleterious action on said base, said material being disseminated throughout said base, the particles of said oil having been emulsified with and covered by a coating material protecting the base from said oil.

2. As a new article of manufacture, a chewing gum comprising a low grade rubber base, a flavoring material comprising an essential oil having a deleterious action on said base, said material being disseminated throughout said base, the particles of said oil having been emulsified with and covered by a coating material protecting the base from said oil.

3. As a new article of manufacture, a chewing gum comprising a low grade rubber base, a flavoring material comprising oil of wintergreen, said material being disseminated throughout said base, the particles of said oil having been emulsified with and covered by a coating material protecting the base from said oil.

4. As a new article of manufacture, a chewing gum comprising low grade rubber base, and flavoring material comprising an essential oil having a deleterious action on said base emulsified with condensed milk.

5. As a new article of manufacture, a chewing gum comprising low grade rubber base, and wintergreen oil emulsified with a casein-bearing material.

6. The method of manufacturing chewing gum, which consists in treating low grade rubber to produce a plastic mass, and adding as a flavoring material, while said mass is heated, an essential oil emulsified with a protective coating material.

In testimony whereof we have hereunto signed our names in the presence of two subscribing witnesses.

WILLIAM C. ARKELL.
MARION G. MASTIN.

Witnesses to the signature of William C. Arkell:
  M. THERESE KANE,
  J. F. ELLITHARP, Jr.

Witnesses to the signature of Marion G. Mastin.
  FRED. M. GEORTNER,
  C. E. SMITH.